(12) United States Patent
Nishida et al.

(10) Patent No.: US 9,331,959 B2
(45) Date of Patent: May 3, 2016

(54) TRANSMISSION APPARATUS AND TRANSMISSION METHOD

(71) Applicant: FUJITSU LIMITED, Kawasaki-shi, Kanagawa (JP)

(72) Inventors: Hiroshi Nishida, Kawasaki (JP); Hideaki Tazawa, Yokohama (JP); Masato Kobayashi, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 378 days.

(21) Appl. No.: 13/906,747

(22) Filed: May 31, 2013

(65) Prior Publication Data

US 2014/0036926 A1 Feb. 6, 2014

(30) Foreign Application Priority Data

Aug. 2, 2012 (JP) ................................. 2012-172395

(51) Int. Cl.
| | |
|---|---|
| *H04L 12/28* | (2006.01) |
| *H04L 12/947* | (2013.01) |
| *H04J 3/14* | (2006.01) |
| *H04J 3/16* | (2006.01) |
| *H04Q 11/00* | (2006.01) |

(52) U.S. Cl.
CPC . *H04L 49/25* (2013.01); *H04J 3/14* (2013.01); *H04J 3/1652* (2013.01); *H04J 2203/006* (2013.01); *H04Q 11/0066* (2013.01)

(58) Field of Classification Search
CPC ............. H04L 49/00; H04Q 2011/002; H04Q 2011/0088; H04Q 2011/0041; H04Q 11/0005; H04Q 11/0066; H04J 14/0227; H04J 14/0212; H04J 14/02; H04J 14/0283
USPC .............. 370/401, 389; 398/45, 161; 359/118
See application file for complete search history.

(56) References Cited

U.S. PATENT DOCUMENTS

| | | | |
|---|---|---|---|
| 7,519,055 B1* | 4/2009 | Zheng et al. | 370/389 |
| 2003/0035167 A1* | 2/2003 | Hill | 359/118 |
| 2004/0141757 A1* | 7/2004 | Sato | 398/161 |
| 2012/0128352 A1* | 5/2012 | Kawasaki et al. | 398/45 |

FOREIGN PATENT DOCUMENTS

JP 2005-286961 10/2005

* cited by examiner

*Primary Examiner* — Dang Ton
*Assistant Examiner* — Lionel Preval
(74) *Attorney, Agent, or Firm* — Staas & Halsey LLP

(57) ABSTRACT

A transmission apparatus includes a detector to receive a multiplexed signal including a plurality of signals having different frame periods and detect switching information included in the multiplexed signal; a sorter to sort a plurality of pieces of detected switching information into one or more groups according to types of corresponding signals; an adjuster to adjust an order of transferring the switching information sorted, according to a period with which the switching information is received; a transfer unit to transfer the plurality of pieces of switching information sorted, based on a result of the adjustment performed by the adjuster; a controller to generate path setting information to set transmission paths of the signals based on the plurality of pieces of switching information transferred from the transfer unit; and a switch unit to set the transmission paths based on the path setting information generated by the controller.

10 Claims, 12 Drawing Sheets

TRANSMISSION APPARATUS AND TRANSMISSION METHOD

CROSS-REFERENCE TO RELATED APPLICATION

This application is based upon and claims the benefit of priority from the prior Japanese Patent Application No. 2012-172395 filed on Aug. 2, 2012, the entire contents of which are incorporated herein by reference.

FIELD

The embodiments discussed herein are related to a transmission apparatus and a transmission method.

BACKGROUND

In a transmission technique, when a failure occurs in a transmission line or at a node, all lines passing through the transmission line or the node having the failure are bypassed to another transmission line or node thereby relieving the lines passing through the failed transmission line or node. In this technique, when an occurrence of a failure is detected at a particular node, switching information as to switching of lines to a detour route is exchanged between this particular node and other nodes. According to the switching information exchanged between nodes, the failed lines are switched to the detour route.

Descriptions of related techniques may be found, for example, in Japanese Laid-open Patent Publication No. 2005-286961.

SUMMARY

According to an aspect of the invention, a transmission apparatus includes a detector configured to receive a multiplexed signal including a plurality of signals having different frame periods and detect switching information included in the multiplexed signal; a sorter configured to sort a plurality of pieces of detected switching information into one or more groups according to types of corresponding signals; an adjuster configured to adjust an order of transferring the switching information sorted, according to a period with which the switching information is received; a transfer unit configured to transfer the plurality of pieces of switching information sorted, based on a result of the adjustment performed by the adjuster; a controller configured to generate path setting information to set transmission paths of the signals based on the plurality of pieces of switching information transferred from the transfer unit; and a switch unit configured to set the transmission paths based on the path setting information generated by the controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
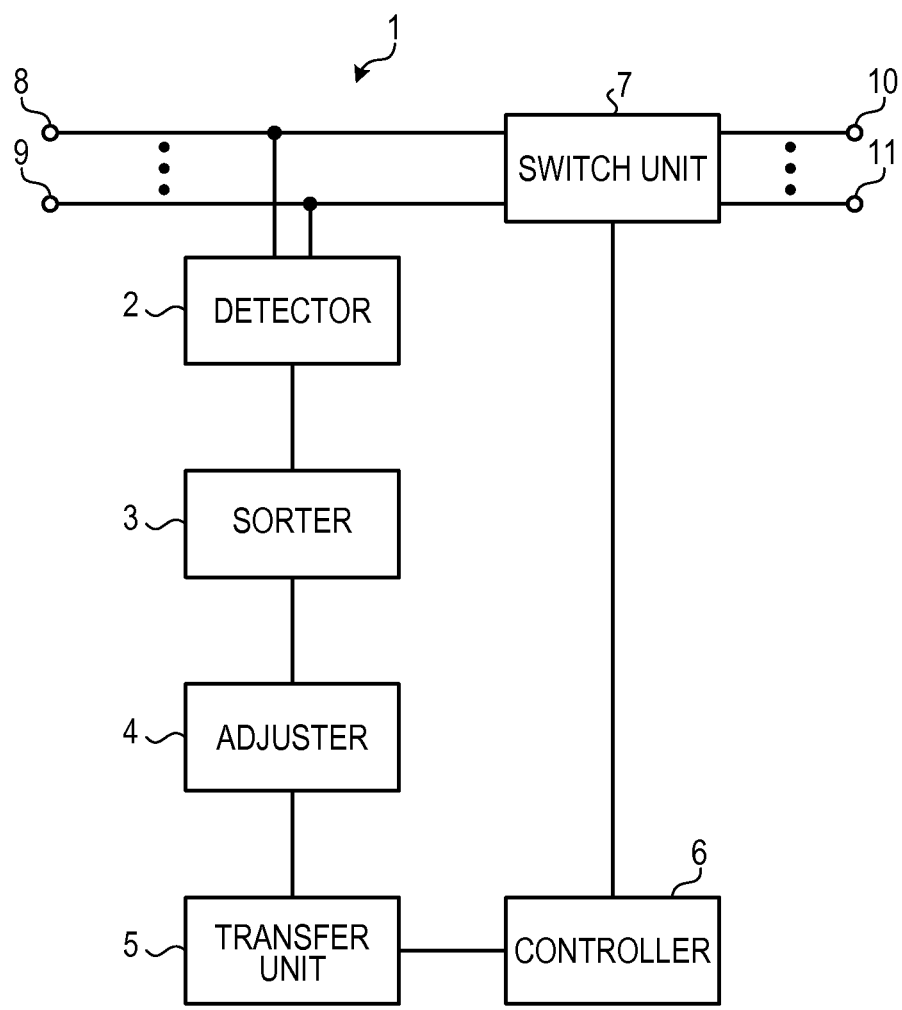
FIG. 1 is a diagram illustrating an example of a transmission apparatus.

In an optical transmission according to recent technology, an optical signal received at each node may include a plurality of signals having different frame periods. In this transmission technique, switching information is included in each of the plurality of signals included in the optical signal received at each node. The switching information arrives at each node at a time corresponding to the frame period of each signal. Each node converts the received optical signal into an electric signal and then detects switching information from the resultant electric signal. The node then performs a process according to the detected switching information. Each node includes a detection circuit configured to detect switching information and a switching circuit configured to process the switching information. The switching information detected by the detection circuit is transferred from the detection circuit to the switching circuit. The detection of switching information is usually performed individually for each signal. The switching information detected from the signals having different frame periods is temporarily stored in memories separately prepared for the respective signals. The switching information temporarily stored in each memory is overwritten (updated) with switching information received next.

Each optical signal may include a large number of signals that are different in frame period. Switching information included in a signal with a small frame period arrives with a short period, while switching information included in a signal with a large frame period arrives with a short period. The plurality of pieces of switching information are sequentially transferred from the detection circuit to a switching circuit. A large number of signals with large frame periods may be included in an optical signal. In this case, a large number of pieces of switching information arrive in bunches at a time. In such a case, at each node, it takes a long time to transfer switching information with a large frame period, which results in an increase in probability that switching information with a smaller frame period may arrive when the switching information with the large frame period is still in process of being transferred. When this is the case, the switching information with the small frame period may be updated with next switching information before the transferring of the switching information with the large frame period to the switching circuit is completed. In this case, the updated switching information with the small frame period is not transferred to the switching circuit, and thus the updated switching information with the small frame period is not processed. The switching information includes a plurality of types of information, and thus non-performing of transferring switching information to the switching circuit may result in various problems. For example, when a failure occurs in a transmission line or at a node, non-transmission of switching information may cause a problem that a line is not switched to a detour route. Contrarily, in a state in which there is no failure in a transmission line or at a node, non-transmission of switching information may cause a problem that a line is unnecessarily switched to a detour route.

Thus, a transmission apparatus and a transmission method configured to be capable of reducing an occurrence of a malfunction in switching of a line to a detour route according to embodiments are described below with reference to drawings.

In embodiments described below, similar constituent elements are denoted by similar reference numerals, and a duplicated description thereof is omitted.

First Embodiment

Figure 2:
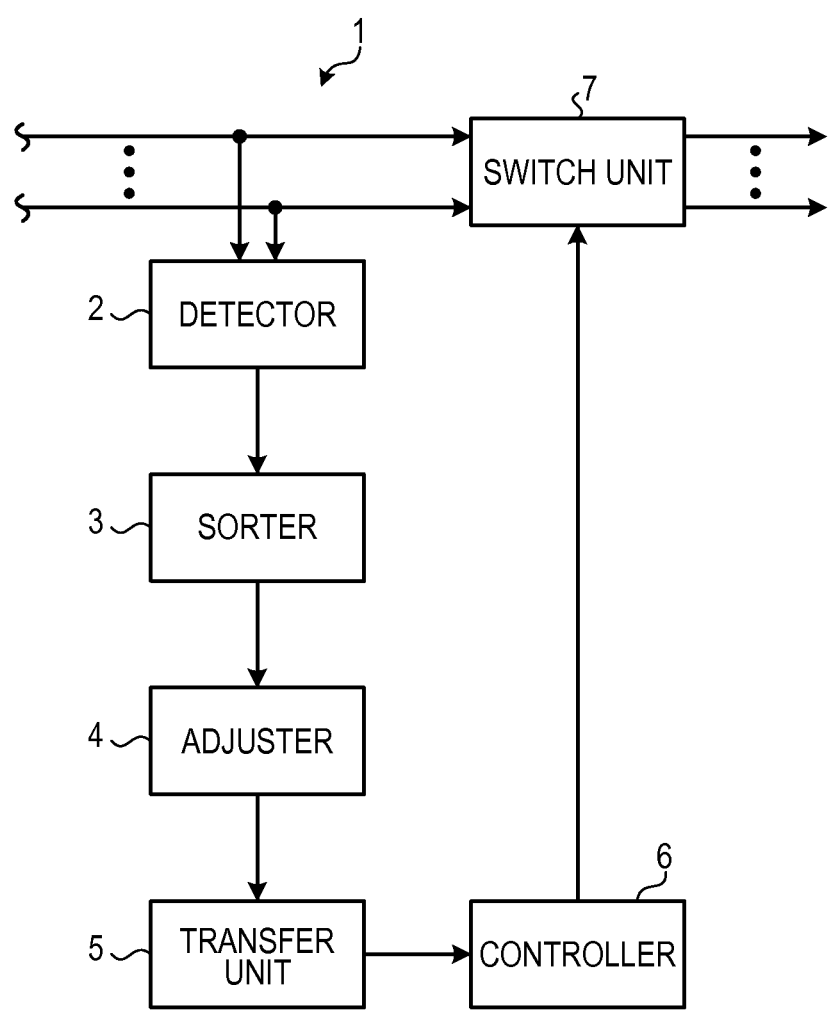
FIG. 2 is a diagram illustrating a signal flow in a transmission apparatus.

FIG. 1 is a diagram illustrating an example of a transmission apparatus. FIG. 2 is a diagram illustrating a signal flow in the transmission apparatus illustrated in FIG. 1. As illustrated in FIG. 1 and FIG. 2, the transmission apparatus 1 includes a detector 2, a sorter 3, an adjuster 4, a transfer unit 5, a controller 6, and a switch unit 7.

The detector 2 is connected to a plurality of input terminals. For example, input terminals 8 and 9 each may be connected to a transmission line. The transmission line may be, for example, an optical transmission line such as an optical fiber, an optical waveguide, or the like. The respective input terminals 8 and 9 receive signals input from the transmission lines. The signals input to the respective input terminals 8 and 9 each include a plurality of signals having different frame periods. The plurality of signals having different frame periods each include switching information as to switching of a line.

The detector 2 receives signals input via the input terminals 8 and 9. The detector 2 detects switching information from the respective signals that are different in frame period.

The sorter 3 is connected to the detector 2. The sorter 3 receives, from the detector 2, a plurality of pieces of switching information detected by the detector 2. The sorter 3 divides the received plurality of pieces of switching information into groups according to types of signals. Each piece of switching information is updated in synchronization with a frame period of an original signal in which the switching information is included.

The adjuster 4 is connected to the sorter 3. The adjuster 4 receives, from the sorter 3, the switching information divided by the sorter 3. The adjuster 4 adjusts an order of transferring switching information depending on the period with which the switching information is received.

The transfer unit 5 is connected to the adjuster 4. The transfer unit 5 receives the plurality of pieces of switching information according to a result of the adjustment performed by the adjuster 4, and serially transfers, to the controller 6, the plurality of pieces of switching information according to the result of the adjustment performed by the adjuster 4.

The controller 6 is connected to the transfer unit 5. The controller 6 receives the plurality of pieces of switching information from the transfer unit 5. Based on the plurality of pieces of switching information, the controller 6 generates path setting information according to which a transmission path of a signal is to be set and transmits the generated path setting information to the switch unit 7.

The switch unit 7 is connected to the input terminals 8 and 9, the controller 6, and a plurality of output terminals 10 and 11. The switch unit 7 receives signals from the respective input terminals 8 and 9. The switch unit 7 also receives the path setting information from the controller 6. The switch unit 7 sets transmission paths for the respective signals based on the path setting information, and the switch unit 7 outputs the signals, for example, to the respective output terminals 10 and 11.

The output terminals 10 and 11 may be respectively connected, for example, to transmission lines. The transmission lines may be an optical transmission line such as an optical fiber, an optical waveguide, or the like.

Figure 3:
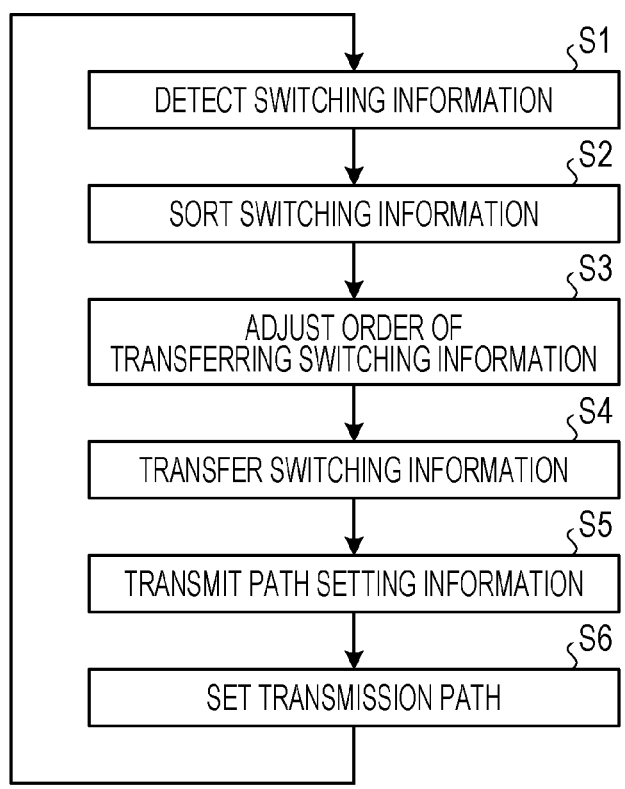
FIG. 3 is a flow chart illustrating an example of a processing flow of a transmission process.

FIG. 3 is a flow chart illustrating an example of a flow of a transmission process. In the transmission apparatus 1, as illustrated in FIG. 3, the detector 2 detects switching information from each of the signals having different frame periods included in the original signals input to the respective input terminals 8 and 9 such that the detector 2 detects respective pieces of switching information at times corresponding to the various frame periods (operation S1).

Thereafter, the sorter 3 divides the plurality of pieces of switching information, detected in operation S1, according to the updating periods (operation S2). That is, in this operation S2, each piece of switching information is classified according to the frame period of a corresponding original signal in which the switching information is included.

Thereafter, the adjuster 4 adjusts the order of transferring the switching information such that the plurality of pieces of switching information divided in operation S2 are transferred in ascending order of time at which next updating of the switching information is to be performed (operation S3). If the adjustment is not performed, there may occur a possibility that when a certain piece of switching information is in process of being transferred to the controller 6 by the transfer unit 5, another piece of switching information may be updated that has a shorter next-update time than that of the switching information in process of being transferred. In this case, the switching information in the not-yet-updated state is not transferred by the transfer unit 5 to the controller 6. However, as a result of the adjustment in operation S3, switching information having a shorter next-update time than that of switching information in process of being transferred is not updated before being transferred to the controller 6.

Thereafter, the transfer unit 5 serially transfers, to the controller 6, the plurality of pieces of switching information divided in operation S2 according to the result of the adjustment performed in operation S3 (operation S4). The controller 6 generates path setting information specifying signal transmission paths based on the plurality of pieces of transferred switching information and transmits the generated path setting information to the switch unit 7 (operation S5). The switch unit 7 sets the transmission paths for signals input via the respective input terminals 8 and 9 based on the received path setting information (operation S6). The transmission apparatus 1 performs repeatedly operation S1 to operation S6.

In the transmission apparatus 1 illustrated in FIG. 1, the adjustment is performed to keep switching information away from being updated during an operation of transferring another switching information, and thus it becomes possible to keep the switching information in the not-yet-updated state away from not being transferred to the controller 6. Therefore, in the transmission apparatus 1, it becomes possible to keep the control unit 6 away from failing to receive some piece of switching information, which may cause a malfunction to occur in switching a line to a detour route.

An example of a transmission apparatus is a transmission apparatus used, for example, in an Optical Transport Network (OTN). In the following description, it is assumed, by way of example, that the transmission apparatus is a transmission apparatus for use in an OTN. The interface of the OTN may be configured according to a recommendation of ITU-T G.709. The recommendation of ITU-T G.709 includes specifications on a frame structure, an overhead, a bit rate, and signal mapping.

Figure 4:
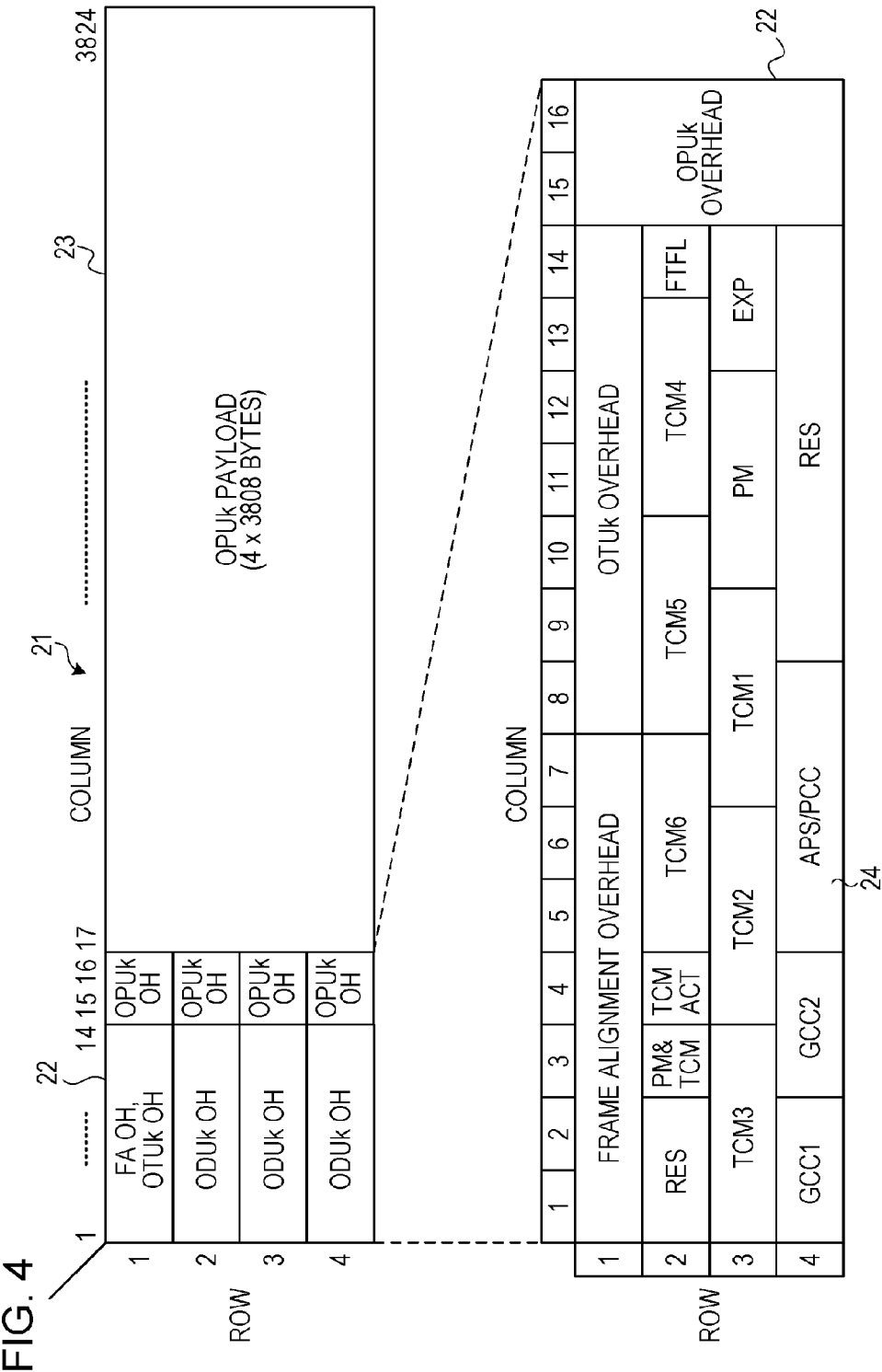
FIG. 4 is a diagram illustrating a frame format in an OTN.

FIG. 4 is a diagram illustrating a frame format in an OTN. As illustrated in FIG. 4, a frame 21 in the OTN includes an overhead (OH) area 22 and an Optical Channel Payload Unit-k (OPUk) payload area 23. Note that k is an index indicating a bit rate and a level of an OPU, an Optical Channel Data Unit (ODU), or an Optical Channel Transport Unit (OTU), and k may take a value of, for example, 0, 1, 2, 3 or 4.

OPUk payloads are client signals. Although not illustrated in FIG. 4, a Forward Error Correction (FEC) area is located following the OPUk payload area 23.

The overhead area 22 includes a Frame Alignment Overhead (FA OH), an OTUk overhead, an ODUk overhead, and an OPUk overhead. In the ODUk overhead, Automatic Protection Switching/Protection Communication Channel (APS/PCC) bytes 24 are defined in columns 5 to 8 in row 4. The transmission apparatus in the OTN monitors lines and controls switching of the lines based on the APS/PCC bytes 24. The monitoring of the lines and the controlling of switching of the lines based on the APS/PCC bytes 24 may be performed according to recommendations of ITU-T G.873.1 and G.873.2.

In the ODUk overhead, Reserved for future international standardization (RES) bytes are reserved for the future international standardization. A Path Monitoring & Tandem Connection Monitoring (PM & TCM) byte defines path monitoring and tandem connection monitoring. A TCM Activation (TCM ACT) byte defines whether the tandem connection monitoring is active or inactive. Bytes of respective TCMs from TCM 1 to TCM 6 define tandem connection monitors 1 to 6. A Fault Type & Fault Location reporting channel (FTFL) byte defines a failure type and a failure location. PM bytes define a path monitor. Experimental (EXP) bytes are bytes for an experiment. Bytes of General Communication Channel (GCC) 1 and bytes of GCC 2 define general-purpose communication channels.

In the OTN, the frame periods vary depending on signal rates, and thus the periods of the APS/PCC bytes 24 vary among signals of the ODU4, the ODU3, the ODU2, the ODU1, the ODU0, and the ODUflex. APS/PCC bytes 24 are provided for each Tributary Slot (TS). Therefore, for example, in a case where ODU0 is mapped onto 80 tributary slots of an OTU 4 frame, APS/PCC bytes 24 are provided for each of 80 channels per port.

Every 8 frames are put into the multiframe structure, and thus each ODU path includes APS/PCC channels in 8 layers. Therefore, for example, in the case of an interface unit having a capacity of 100 Gbps, the transmission apparatus performs the detection and the process for APS/PCC bytes 24 in a total of 640 channels in 8 layers of 80 tributary slots. In a case where mapping is mapped onto 80 tributary slots such that two or more of ODU3, ODU2, ODU1, ODU0, and ODUflex are mixed, the transmission apparatus performs the process on the mixture of APS/PCC bytes 24 with different periods.

Specific examples of frame periods of ODUk and frame periods of respective layers are described below. Note that the updating period of the APS/PCC bytes 24 is equal to the frame period of each layer. As for the ODU4, the frame period is 1.168 μs and the frame period of each layer is 9.344 μs. As for the ODU3, the frame period is 3.035 μs and the frame period of each layer is 24.28 μs. As for the ODU2, the frame period is 12.191 μs and the frame period of each layer is 97.528 μs. As for the ODU1, the frame period is 48.971 μs and the frame period of each layer is 391.768 μs. As for the ODU0, the frame period is 98.354 μs and the frame period of each layer is 786.832 μs. In the case of the ODUflex, the frame period and the frame period of each layer are dependent on the rate of the client signal.

The ITU-T recommendation prescribes that in Shared Ring Protection (SRP) in a Bidirectional Line Switched Ring (BLSR) structure, switching of a BLSR is supposed to be completed within 50 ms over the whole ring. To achieve this, each node (transmission apparatus) in the ring processes BLSR APS/PCC bytes 24 in priority to ODUk APS/PCC bytes 24.

Second Embodiment

Figure 5:
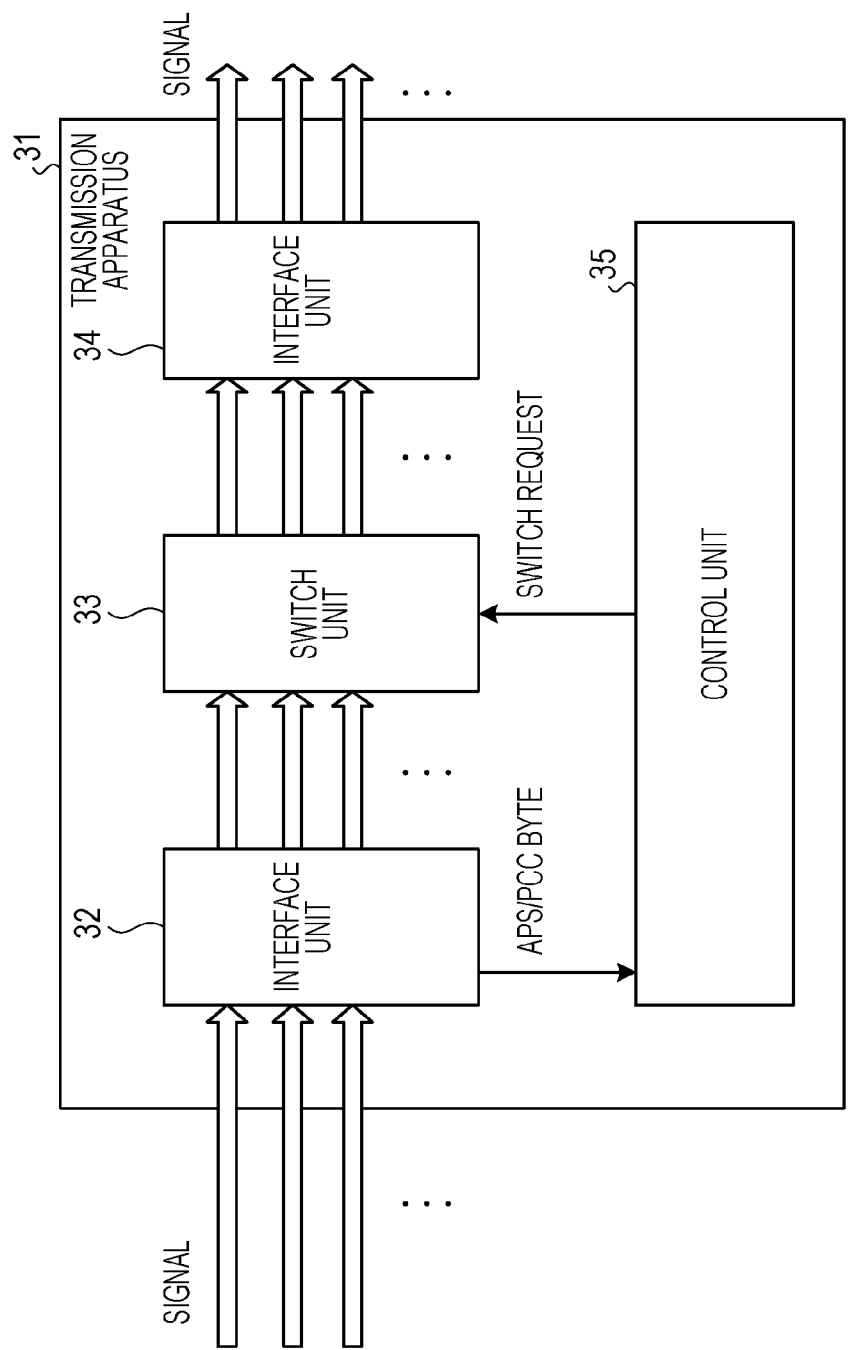
FIG. 5 is a diagram illustrating another example of a transmission apparatus.

FIG. 5 is a diagram illustrating another example of a transmission apparatus. As illustrated in FIG. 5, the transmission apparatus 31 includes, for example, an interface unit 32 on an input side as an example of a detector, a control unit 35 as an example of controller, and a switch unit 33 as an example of a switch unit. The transmission apparatus 31 may further include an interface unit 34 on an output side.

The interface unit 32 on the input side includes a plurality of ports. The ports may be connected to respective optical transmission lines. Each optical transmission line may be, for example, an optical fiber, an optical waveguide, or the like. A signal is input to each port of the interface unit 32 on the input side. The signals input to the respective ports may not be synchronous to each other. The interface unit 32 on the input side outputs the signals received from the respective ports to the switch unit 33. Furthermore, the interface unit 32 on the input side detects, from the signals input to the respective pots, switching information as to switching of lines. An example of switching information is APS/PCC bytes 24.

The control unit 35 is connected to the interface unit 32 on the input-side. The control unit 35 receives, for example, APS/PCC bytes 24 from the interface unit 32 on the input side. The control unit 35 generates path setting information based on, for example, the APS/PCC bytes 24 and transmits the generated path setting information to the switch unit 33. An example of path setting information is a path switching request.

The switch unit 33 is connected to the interface unit 32 on the input side and the control unit 35. An example of a switch unit 33 is a cross-connect switch. The switch unit 33 receives signals from the interface unit 32 on the input side, and the switch unit 33 receives, for example, a switch request from the control unit 35. Based, for example, on the switch request, the switch unit 33 sets transmission paths of the respective signals according to a switching procedure defined in APS/PCC bytes 24, and outputs the respective signals to the interface unit 34 on the output side.

The interface unit 34 on the output side is connected to the switch unit 33. The interface unit 34 on the output side includes a plurality of ports. The ports may be connected to respective optical transmission lines. Each optical transmission line may be, for example, an optical fiber, an optical waveguide, or the like. The interface unit 34 on the output side outputs signals via the respective ports.

Example of Functional Blocks Configured to Process APS/PCC Bytes (1)

Figure 6:
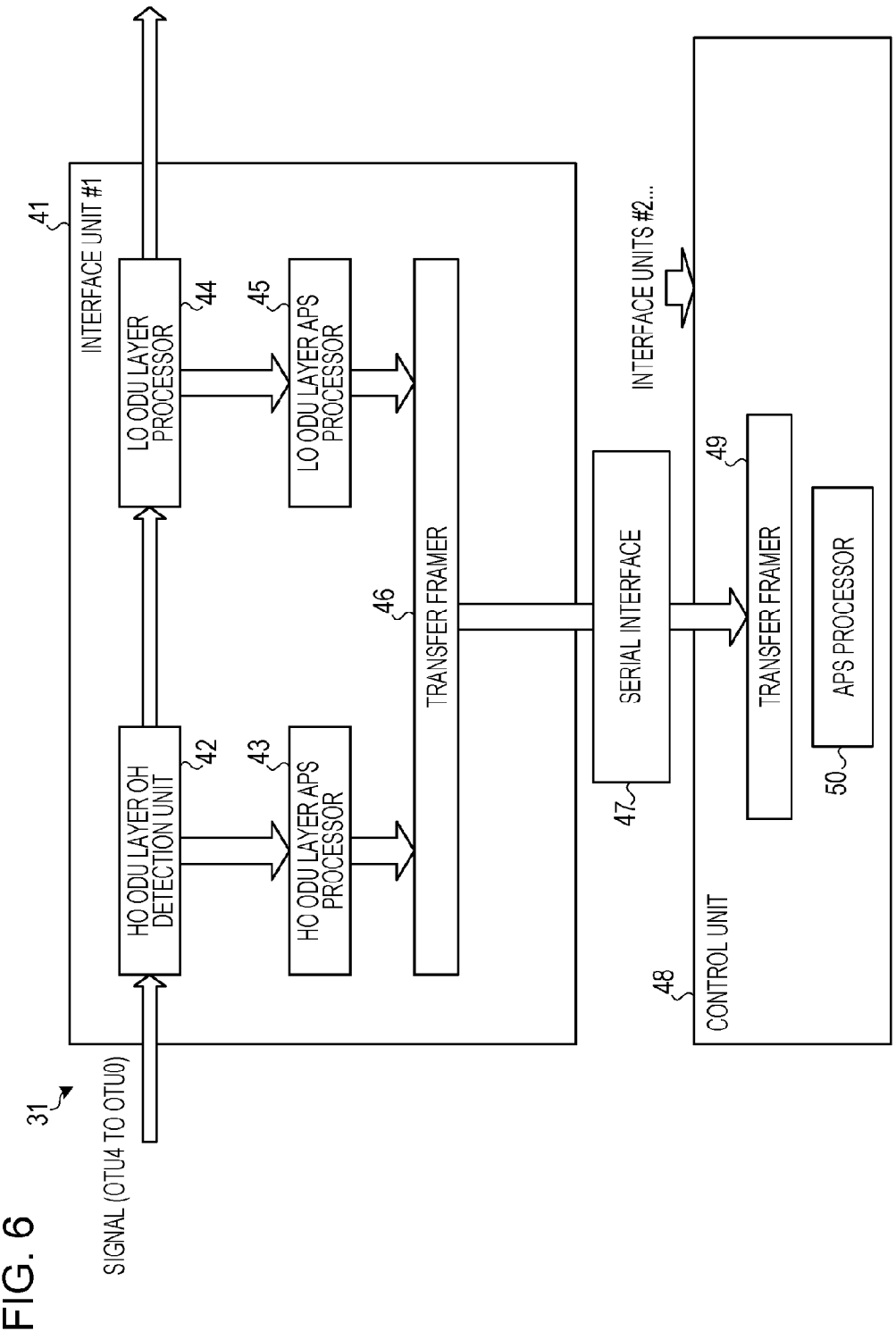
FIG. 6 is a diagram illustrating an example of configuration of functional blocks associated with processing of APS/PCC bytes performed in a transmission apparatus.

FIG. 6 is a diagram illustrating an example of configuration of functional blocks associated with processing of APS/PCC bytes performed in the transmission apparatus illustrated in FIG. 5. As illustrated in FIG. 6, the transmission apparatus 31 includes an interface unit #1 41 (note that #1 denotes a first unit and 41 is a reference numeral denoting a specific unit (similar notations will be used elsewhere in this description)), a control unit 48 and a serial interface 47.

The interface unit #1 41 is one of interface units on the input side. The interface units on the input side include a plurality of interface units (#1, #2, . . . ) which are similar in configuration. The interface unit #1 41 of the plurality of interface units on the input side is taken as an example in the following description.

As illustrated in FIG. 6, the interface unit #1 41 includes a Higher Order (HO) ODU layer Overhead (OH) detection processor 42 and an HO ODU layer APS processor 43. The HO ODU layer OH detection processor 42 is connected to ports on the input side. Signals (OTU 4 to OTU 0) input from the ports are applied to the HO ODU layer OH detection processor 42. The HO ODU layer OH detection processor 42 detects, from the overhead of the input signal, APS/PCC bytes of the ODU4 level in as many channels as the number of ports times the number of channels included in total of 8 layers.

The HO ODU layer APS processor 43 is connected to the HO ODU layer OH detection processor 42. The HO ODU layer APS processor 43 receives APS/PCC bytes from the HO ODU layer OH detection processor 42. The ITU-T recommendation prescribes that the APS/PCC bytes are updated when the APS/PCC bytes take an equal value successively three times. The HO ODU layer APS processor 43 monitors the value of the APS/PCC bytes received from the HO ODU layer OH detection processor 42. If an equal value is received as the APS/PCC bytes three times successively, the current value of the APS/PCC bytes is updated to the equal value received three times successively.

The interface unit #1 41 includes a Lower Order (LO) ODU layer processor 44 and an LO ODU layer APS processor 45. The LO ODU layer processor 44 is connected to the HO ODU layer OH detection processor 42. The LO ODU layer processor 44 receives a signal from the HO ODU layer OH detection processor 42. The LO ODU layer processor 44 detects, from the input signal, APS/PCC bytes of the levels of ODU3 to ODU0 for as many channels as the product of the number of ports, the number of tributary slot, and the number of channels of 8 layers.

The LO ODU layer APS processor 45 is connected to the LO ODU layer processor 44. The LO ODU layer APS processor 45 receives APS/PCC bytes from the LO ODU layer processor 44. According to the ITU-T recommendation, the LO ODU layer APS processor 45 monitors the APS/PCC bytes received from the LO ODU layer processor 44. If equal values are detected three times successively for the APS/PCC bytes, then the LO ODU layer APS processor 45 updates the values of the APS/PCC bytes to the equal values successively detected three times.

The interface unit #1 41 includes a transfer framer 46. The transfer framer 46 is connected to the HO ODU layer APS processor 43 and the LO ODU layer APS processor 45. The transfer framer 46 receives APS/PCC bytes from the HO ODU layer APS processor 43 and the LO ODU layer APS processor 45, and the transfer framer 46 maps the APS/PCC bytes into a data structure suitable for transmitting to the control unit 48.

The serial interface 47 is connected to the transfer framer 46 of the interface unit #1 41. The serial interface 47 serially transfers the APS/PCC bytes output from the transfer framer 46 to the control unit 48 in a time shorter than an updating period shortest of all updating periods of APS/PCC bytes of all ODUk levels.

For example, of ODU4 to ODU0, ODU4 has a shortest frame period. As described above, ODU4 has a frame period of 1.168 μs and the updating period (frame period of each layer) of the APS/PCC bytes is 9.344 μs. Actually, the values of the APS/PCC bytes are updated when an equal value successively appears three times. Therefore, it is sufficient if all APS/PCC bytes in 24 frames in a multiframe structure are transmitted within 3 times 9.344 μs, that is, 28.032 μs. This allows it to transfer all APS/PCC bytes in 24 frames in the multiframe structure to the control unit 48 before updating is performed.

The APS/PCC bytes include 32 bits. However, actually, the APS/PCC bytes are transferred together with an attached overhead including switch request information, alarm information, and the like. Therefore, to handle the overhead, the APS/PCC bytes may include a total of 60 bits per channel. Thus, when APS/PCC bytes are transferred in 8 channels, the transfer rate of the serial interface 47 may be 17.14 Mbps according to equation (1) described below. When APS/PCC bytes are transferred in 640 channels, the transfer rate of the serial interface 47 may be 1.37 Gbps according to equation (2) described below.

$$60 \text{ [bits/channel]} \times 8 \text{ [channels]}/28 \text{ [μs]}=17.14 \text{ [Mbps]} \quad (1)$$

$$60 \text{ [bits/channel]} \times 640 \text{ [channels]}/28 \text{ [μs]}=1.37 \text{ [Gbps]} \quad (2)$$

The control unit 48 includes a transfer framer 49 and an APS processor 50. The APS/PCC bytes transferred from the interface unit #1 41 via the serial interface 47 are transmitted to the APS processor 50 via the transfer framer 49. When the APS processor 50 receives the APS/PCC bytes, the APS processor 50 performs processing on the received APS/PCC bytes and determines whether to switch lines. According to a result of the determination, the APS processor 50 may transmit, for example, a switch request to a not-illustrated switch unit.

In the transmission apparatus 31 illustrated in FIG. 6, all APS/PCC bytes in the 24 frames configured in the multiframe structure are transferred to the control unit 48 in a time shorter than the shortest updating period of APS/PCC bytes, wherein the shortest updating period occurs for the ODU4 level. This keeps APS/PCC bytes with a shorter updating period away from being updated during an operation of transferring APS/PCC bytes with a longer updating period, and thus it becomes possible to allow APS/PCC bytes to be correctly transferred to the controller 6 before the APS/PCC bytes are updated. Therefore, in the transmission apparatus 31, it becomes possible to keep the control unit 48 away from failing to receive some APS/PCC bytes, which may cause a malfunction to occur in switching a line to a detour route. Even in a case where a signal with a frame period shorter than that of ODU4 is added in the future, it is sufficient if the transfer rate of the serial interface 47 is simply increased.

Example of Functional Blocks Configured to Process APS/PCC Bytes (2)

Figure 7:
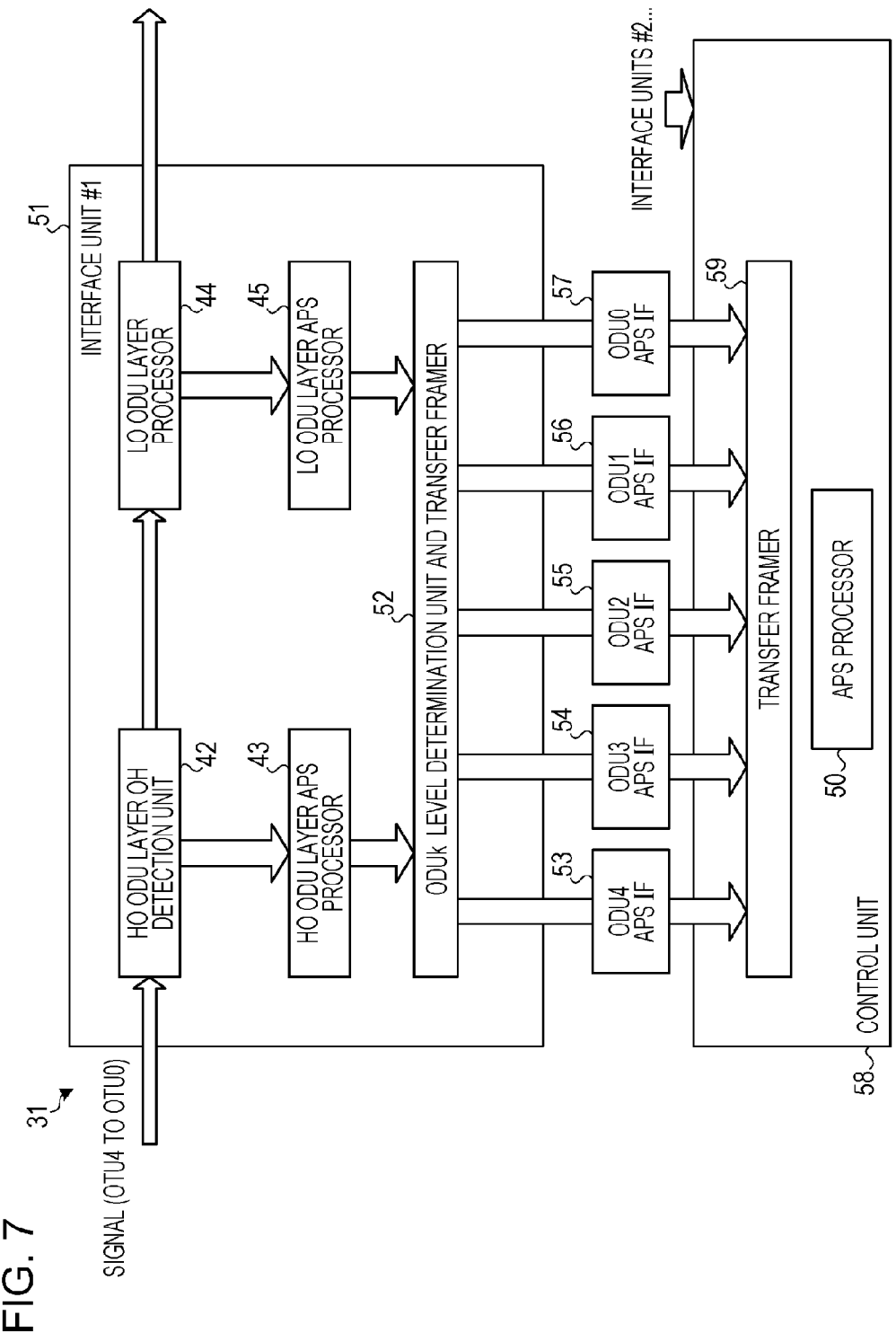
FIG. 7 is a diagram illustrating an example of configuration of functional blocks associated with processing of APS/PCC bytes performed in a transmission apparatus.

FIG. 7 is a diagram illustrating another example of configuration of functional blocks associated with processing of APS/PCC bytes performed in the transmission apparatus illustrated in FIG. 5. In FIG. 7, similar elements to those in the transmission apparatus 31 illustrated in FIG. 6 are denoted by similar reference numerals and a duplicated explanation thereof is omitted. As illustrated in FIG. 7, the transmission apparatus 31 includes an interface unit #1 51 a control unit 58 and APS interfaces (IFs) 53 to 57 for levels of ODU4 to ODU0, respectively.

The interface unit #1 51 is one of interface units on the input side. The interface units on the input side include a plurality of interface units (#1, #2, ... ) which are similar in configuration. The interface unit #1 51 of the plurality of interface units on the input side is taken as an example in the following description.

As illustrated in FIG. 7, the interface unit #1 51 includes an HO ODU layer OH detection processor 42, an HO ODU layer APS processor 43, an LO ODU layer processor 44 and an LO ODU layer APS processor 45. The HO ODU layer OH detection processor 42, the HO ODU layer APS processor 43 the LO ODU layer processor 44 and the LO ODU layer APS processor 45 are similar to those described above, and thus a further description thereof is omitted.

The interface unit #1 51 includes, as an example of a sorter, an ODUk level determination unit and transfer framer 52. The ODUk level determination unit and transfer framer 52 is connected to the HO ODU layer APS processor 43 and the LO ODU layer APS processor 45. The ODUk level determination unit and transfer framer 52 receives APS/PCC bytes from the HO ODU layer APS processor 43 and the LO ODU layer APS processor 45. The ODUk level determination unit and transfer framer 52 determines the ODUk level of the APS/PCC bytes and divides the APS/PCC bytes and sends the divided APS/PCC bytes to corresponding APS IFs 53 to 57 depending on the ODUk level detected as a result of the determination such that the APS/PCC bytes are mapped into a data structure optimum for transmission.

More specifically, APS/PCC bytes are divided and sent as follows. APS/PCC bytes of the ODU4 level are sent to the ODU4 APS IF 53. APS/PCC bytes of the ODU3 level are sent to the ODU3 APS IF 54. APS/PCC bytes of the ODU2 level are sent to the ODU2 APS IF 55. APS/PCC bytes of the ODU1 level are sent to the ODU1 APS IF 56. APS/PCC bytes of the ODU0 level are sent to the ODU0 APS IF 57.

The locations of the respective types of ODUk in the tributary slots of the ports may be set in advance by software. The ODUk level determination unit and transfer framer 52 may divide the APS/PCC bytes of the respective ODUk levels and send them to the corresponding APS IFs 53 to 57 according to the setting made in advance in the above-described manner. Alternatively, the ODUk level determination unit and transfer framer 52 may divide the APS/PCC bytes according to Multiplex Structure Identifier (MSI) bytes of Payload Structure Identifier (PSI). Note that details of PSI and MSI are prescribed in the ITU-T G.709 recommendation.

The APS IFs 53 to 57 of the levels of ODU4 to ODU0 are connected to the ODUk level determination unit and transfer framer 52. The APS IFs 53 to 57 of the levels of ODU4 to ODU0 have separate wirings dedicated thereto. The APS/PCC bytes of the respective ODUk levels are transferred to the control unit 58 via the wirings assigned to the respective ODUk levels. Thus, the APS IFs 53 to 57 of the respective levels of ODU4 to ODU0 serially transfer the APS/PCC bytes to the control unit 58 with periods corresponding to the respective ODUk levels.

In the ODU4, the updating period of the APS/PCC bytes is 28.032 μs, and there are up to 8 channels via which APS/PCC bytes are transferred. Therefore, the transfer rate of the ODU4 APS IF 53 may be 17.14 Mbps according to equation (1) described above.

As described above, the updating period (frame period of each layer) of the APS/PCC bytes of the ODU3 is 24.28 μs.

Actually, the APS/PCC bytes are updated when equal values appear three times successively. Therefore, it is sufficient if all APS/PCC bytes of the ODU3 level in 24 frames in the multiframe structure are transmitted within 3 times 24.28 μs, that is, 72.84 μs. There are up to 16 channels via which APS/PCC bytes are transferred. Therefore, the transfer rate of the ODU3 APS IF 54 may be, for example, 13.3 Mbps according to equation (3) described below.

$$60 \text{ [bits/channel]} \times 16 \text{ [channels]}/72 \text{ [μs]} = 13.3 \text{ [Mbps]} \quad (3)$$

As described above, the updating period (frame period of each layer) of the APS/PCC bytes of the ODU2 is 97.528 μs. Actually, it is sufficient if all APS/PCC bytes on the ODU2 level in 24 frames in the multiframe structure are transmitted within 3 times 97.528 μs, that is, 292.584 μs. There are up to 80 channels in which APS/PCC bytes are transferred. Therefore, the transfer rate of the ODU2 APS IF 55 may be 16.4 Mbps according to equation (4) described below.

$$60 \text{ [bits/channel]} \times 80 \text{ [channels]}/292 \text{ [μs]} = 16.4 \text{ [Mbps]} \quad (4)$$

As described above, the updating period (frame period of each layer) of the APS/PCC bytes of the ODU1 is 391.768 μs. Actually, it is sufficient if all APS/PCC bytes on the ODU1 level in 24 frames in the multiframe structure are transmitted within 3 times 391.768 μs, that is, 1175.304 μs, and there are up to 320 channels via which APS/PCC bytes are transferred. Therefore, the transfer rate of the ODU1 APS IF 56 may be, for example, 16.3 Mbps according to equation (5) described below.

$$60 \text{ [bits/channel]} \times 320 \text{ [channels]}/1175 \text{ [μs]} = 16.3 \text{ [Mbps]} \quad (5)$$

As described above, the updating period (frame period of each layer) of the APS/PCC bytes of the ODU0 is 786.832 μs. Actually, it is sufficient if all APS/PCC bytes on the ODU0 level in 24 frames in the multiframe structure are transmitted within 3 times 786.832 μs, that is, 2360.496 μs, and there are up to 640 channels via which APS/PCC bytes are transferred. Therefore, the transfer rate of the ODU0 APS IF 57 may be, for example, 16.2 Mbps according to equation (6) described below.

$$60 \text{ [bits/channel]} \times 640 \text{ [channels]}/2360 \text{ [μs]} = 16.2 \text{ [Mbps]} \quad (6)$$

The control unit 58 includes a transfer framer 59 and an APS processor 50. The APS/PCC bytes transferred from the interface unit #1 51 via the APS IFs 53 to 57 of the levels of ODU4 to ODU0 are transmitted to the APS processor 50 via the transfer framer 59. When the APS processor 50 receives the APS/PCC bytes, the APS processor 50 performs processing on the received APS/PCC bytes and determines whether to switch lines. According to a result of the determination, the APS processor 50 may transmit, for example, a switch request to a not-illustrated switch unit.

In the transmission apparatus 31 illustrated in FIG. 7, APS/PCC bytes are transferred to the control unit 58 using individual wirings assigned to the respective ODUk levels. This keeps APS/PCC bytes with a shorter updating period away from being updated during an operation of transferring APS/PCC bytes with a longer updating period, and thus it becomes possible to allow APS/PCC bytes to be correctly transferred to the controller 6 before the APS/PCC bytes are updated. Therefore, in the transmission apparatus 31, it becomes possible to keep the control unit 58 away from failing to receive some APS/PCC bytes, which may cause a malfunction to occur in switching a line to a detour route. Even in a case where a signal according to a new standard, such as a signal with a rate of 400 Gbps, is added in the future, it is sufficient if an interface and a wiring according to the new standard are added.

Example of Functional Blocks Configured to Process APS/PCC Bytes (3)

Figure 8:
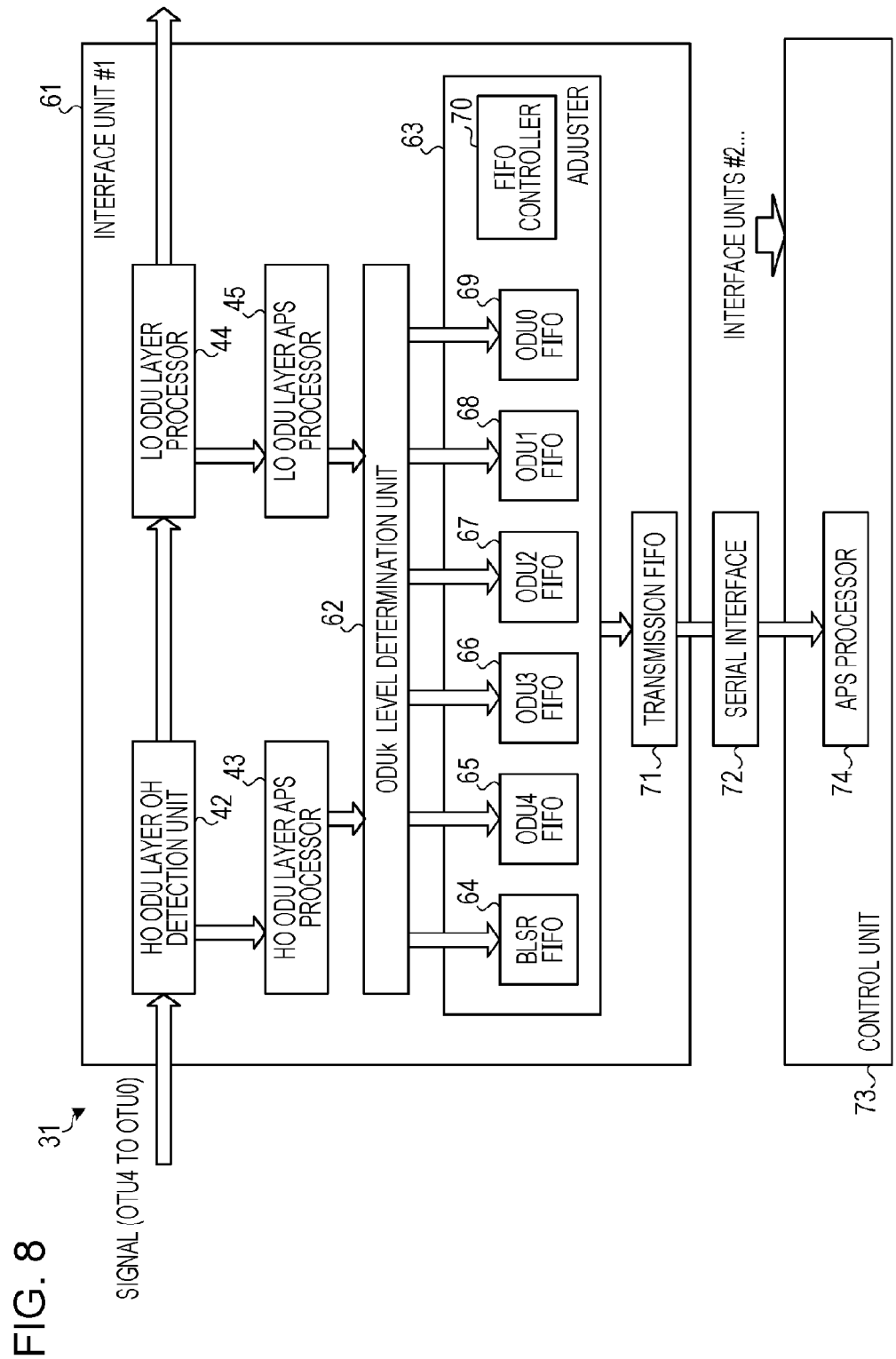
FIG. 8 is a diagram illustrating an example of configuration of functional blocks associated with processing of APS/PCC bytes performed in a transmission apparatus.

FIG. 8 is a diagram illustrating an example of configuration of functional blocks associated with processing of APS/PCC bytes performed in the transmission apparatus illustrated in FIG. 5. In FIG. 8, similar elements to those in the transmission apparatus 31 illustrated in FIG. 6 are denoted by similar reference numerals and a duplicated explanation thereof is omitted. As illustrated in FIG. 8, the transmission apparatus 31 includes an interface unit #1 61, a control unit 73 and a serial interface 72.

The interface unit #1 61 is one of interface units on the input side. The interface units on the input side include a plurality of interface units (#1, #2, . . . ) which are similar in configuration. The interface unit #1 61 of the plurality of interface units on the input side is taken as an example in the following description.

As illustrated in FIG. 8, the interface unit #1 61 includes an HO ODU layer OH detection processor 42, an HO ODU layer APS processor 43, an LO ODU layer processor 44 and an LO ODU layer APS processor 45. The HO ODU layer OH detection processor 42, the HO ODU layer APS processor 43, the LO ODU layer processor 44 and the LO ODU layer APS processor 45 are similar to those described above, and thus a further description thereof is omitted.

The interface unit #1 61 includes, as an example of a sorter, an ODUk level determination unit 62. The ODUk level determination unit 62 is connected to the HO ODU layer APS processor 43 and the LO ODU layer APS processor 45. The ODUk level determination unit 62 receives APS/PCC bytes from the HO ODU layer APS processor 43 and the LO ODU layer APS processor 45. The ODUk level determination unit 62 determines the ODUk level of the APS/PCC bytes.

As described above, the locations of the respective types of ODUk in the tributary slots of the ports may be set in advance by software, and the ODUk level determination unit 62 may determine the ODUk level of the APS/PCC bytes based on the setting made in advance. Alternatively, the ODUk level determination unit 62 may determine the ODUk level based on MSI bytes of PSI included in the overhead of the OPUk.

The interface unit #1 61 includes an adjuster 63. The adjuster 63 includes a First-In First-Out (FIFO) memory 64 for the BLSR (hereinafter referred to as the BLSR FIFO memory 64), a FIFO memory 65 for the ODU4 (hereinafter referred to as the ODU4 FIFO memory 65), a FIFO memory 66 for the ODU3 (hereinafter referred to as the ODU3 FIFO memory 66), a FIFO memory 67 for the ODU2 (hereinafter referred to as the ODU2 FIFO memory 67), a FIFO memory 68 for the ODU1 (hereinafter referred to as the ODU1 FIFO memory 68), and a FIFO memory 69 for the ODU0 (hereinafter referred to as the ODU0 FIFO memory 69). The FIFO memories 64 to 69 for the BLSR and the ODUk are connected to the ODUk level determination unit 62.

The ODUk level determination unit 62 divides the APS/PCC bytes of the ODUk levels and sends them to corresponding FIFO memories 64 to 69 based on a result of the determination as to the ODUk levels of the APS/PCC bytes. More specifically, the APS/PCC bytes of the BLSR are sent to the BLSR FIFO memory 64, the APS/PCC bytes of the ODU4 level are sent to the ODU4 FIFO memory 65, the APS/PCC bytes of the ODU3 level are sent to the ODU3 FIFO memory 66, the APS/PCC bytes of the ODU2 level are sent to the ODU2 FIFO memory 67, the APS/PCC bytes of the ODU1 level are sent to the ODU1 FIFO memory 68, and the APS/PCC bytes of the ODU0 level are sent to the ODU0 FIFO memory 69. The FIFO memories 64 to 69 assigned for BLSR and ODUk store the APS/PCC bytes sent by the ODUk level determination unit 62.

The adjuster 63 includes a FIFO controller 70. The FIFO controller 70 controls timing of outputting APS/PCC bytes from the respective FIFO memories 64 to 69 assigned for BLSR and ODUk. The FIFO controller 70 defines priority levels for timing of outputting APS/PCC bytes in ascending order of updating periods. As described above, the APS/PCC bytes of BLSR pass through up to 16 nodes in a ring structure, and switching of transmission paths is achieved within 50 msec. Therefore, the FIFO controller 70 outputs the APS/PCC bytes of the BLSR in highest priority over the APS/PCC bytes of the ODUk levels.

Furthermore, the adjuster 63 outputs APS/PCC bytes stored in the FIFO memories 64 to 69 of the BLSR and the ODUk such that a high priority is given to APS/PCC bytes that are to be updated next in a time less than the threshold value. Details of the adjuster 63 will be described later.

The interface unit #1 61 includes a transmission FIFO memory 71. The transmission FIFO memory 71 is connected to the FIFO memories 64 to 69 assigned for BLSR and ODUk. The transmission FIFO memory 71 stores APS/PCC bytes output from the respective FIFO memories 64 to 69 for BLSR and ODUk.

The serial interface 72 is connected to the transmission FIFO memory 71 of the interface unit #1 61. The serial interface 72 serially transfers APS/PCC bytes output from the transmission FIFO memory 71 to the control unit 73.

The control unit 73 includes an APS processor 74. The APS/PCC bytes transferred from the interface unit #1 61 via the serial interface 72 are transmitted to the APS processor 74. When the APS processor 74 receives the APS/PCC bytes, the APS processor 74 performs processing on the received APS/PCC bytes and determines whether to switch lines. According to a result of the determination, the APS processor 74 may transmit, for example, a switch request to a not-illustrated switch unit. In the transmission apparatus 31 illustrated in FIG. 8, the transmission processing flow is similar to that illustrated in FIG. 3.

Example of Adjuster

Figure 9:
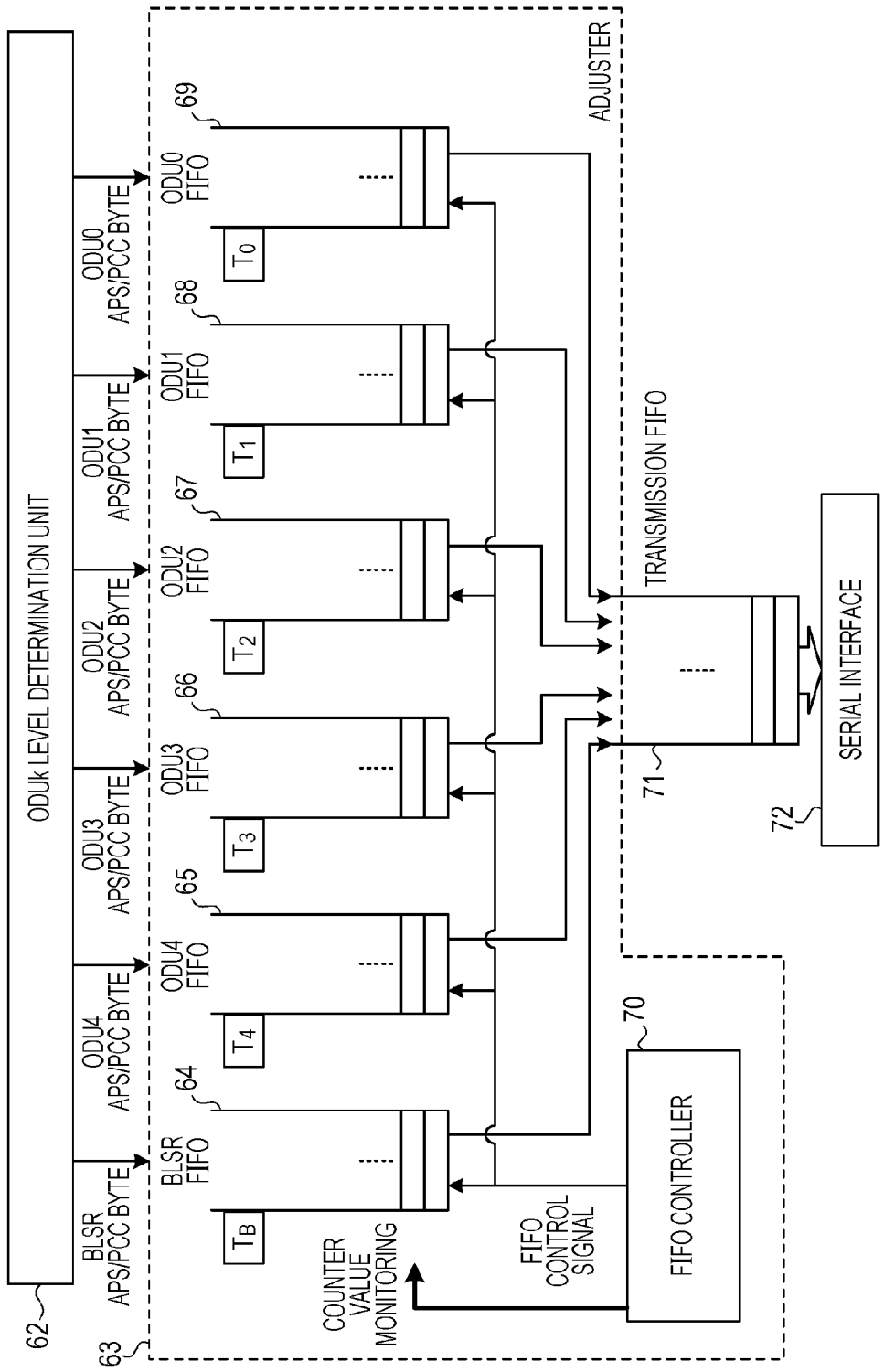
FIG. 9 is a diagram illustrating an example of an adjuster.

FIG. 9 is a diagram illustrating an example of the adjuster illustrated in FIG. 8. As illustrated in FIG. 9, when BLSR APS/PCC bytes are stored in the BLSR FIFO memory 64, an initial value $T_B$ is set in association with APS/PCC bytes stored in the BLSR FIFO memory 64. Similarly, when APS/PCC bytes at ODUk levels are stored in the respective ODUk FIFO memories 65 to 69, initial values $T_k$ are set in association with the APS/PCC bytes stored in the ODUk FIFO memories.

The initial values $T_k$ associated with the ODUk may have values that allow the APS/PCC bytes of the respective ODUk to be transmitted to the serial interface 72 in ascending order of updating periods before the APS/PCC bytes are updated next. The initial value $T_B$ of the BLSR may be selected to be smaller than an initial value of an ODUk with a shortest updating period, that is, the initial value $T_4$ of the ODU4. The initial value $T_B$ of the BLSR and the initial values $T_k$ of the ODUk may be set in advance.

The counter values associated with the APS/PCC bytes stored in the respective FIFO memories 64 to 69 for the BLSR and the ODUk are decremented with periods corresponding to periods with which the serial interface 72 transfers the APS/PCC bytes to the control unit 73. For example, each time the serial interface 72 transmits one set of APS/PCC bytes to the control unit 73, the counter values associated with the APS/PCC bytes stored in a corresponding one of the FIFO memories 64 to 69 of the BLSR and the ODUk may be decremented.

The FIFO controller 70 monitors the counter values associated with the APS/PCC bytes stored in the respective FIFO memories 64 to 69 of the BLSR and the ODUk. The FIFO controller 70 outputs a FIFO control signal to one of FIFO memories 64 to 69 in which APS/PCC bytes corresponding to the least counter value are stored thereby to control the FIFO memories to output the corresponding APS/PCC bytes. The FIFO controller 70 outputs a FIFO control signal to FIFO memories 64 to 69 in which APS/PCC bytes corresponding to a counter value smaller than a threshold value are stored thereby to control the FIFO memories to output the corresponding APS/PCC bytes.

In response to receiving the FIFO control signal from the FIFO controller 70, the FIFO memories 64 to 69 of the BLSR and the ODUk output oldest APS/PCC bytes stored therein. Note that when APS/PCC bytes are output from the FIFO memories 64 to 69 in which APS/PCC bytes with counter values less than the threshold value are stored, the counter values are not decremented.

Figure 10:
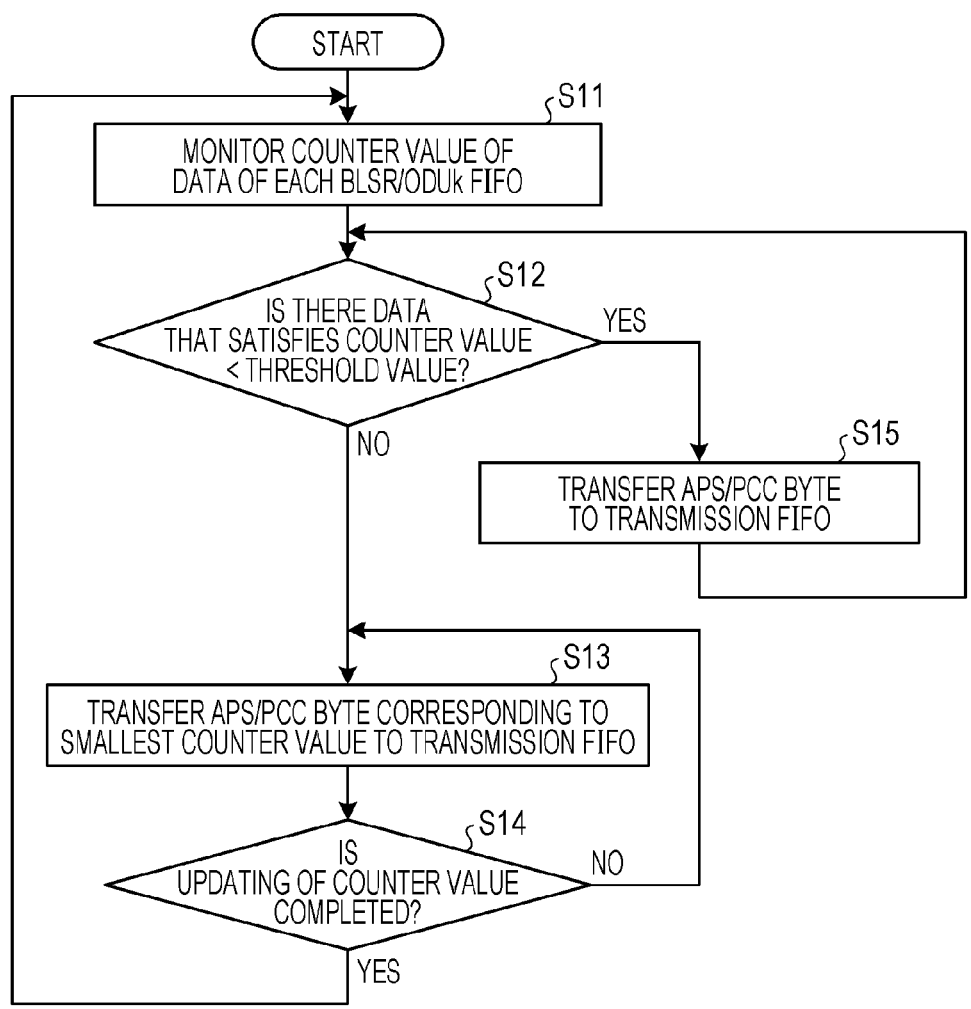
FIG. 10 is a diagram illustrating an example of an operation of an adjuster.

FIG. 10 is a diagram illustrating an example of an operation of the adjuster illustrated in FIG. 9. As illustrated in FIG. 10, when the adjustment operation is started in the adjuster 63, the FIFO controller 70 first monitors the counter values associated with data stored in the respective FIFO memories 64 to 69 of the BLSR and the ODUk, that is, the counter values associated with the APS/PCC bytes (operation S11). The FIFO controller 70 then determines whether any counter value being monitored in operation S11 is less than the threshold value (operation S12).

In a case where all counter values are equal to or greater than the threshold value (that is when the answer to operation S12 is No), the FIFO controller 70 outputs a FIFO control signal to one of FIFO memories 64 to 69 in which APS/PCC bytes corresponding to the least counter value are stored. In response, the one of FIFO memories 64 to 69 in which APS/PCC bytes corresponding to the least counter value are stored transfers oldest ones of the stored APS/PCC bytes to the transmission FIFO memory 71 (operation S13).

The transferring in operation S13 is performed repeatedly until the updating of the counter values is completed (that is, the transferring in operation S13 is performed repeatedly as long as the answer to operation S14 is No). When the updating of the counter values is completed (that is, when the answer to operation S14 is Yes), the processing flow returns to operation S11 to repeat the operation from operation S11.

On the other hand, in a case where counter values less than the threshold value are detected (that is, when the answer to operation S12 is Yes), the FIFO controller 70 outputs a FIFO control signal to FIFO memories 64 to 69 in which APS/PCC bytes corresponding to the counter values less than the threshold value are stored. In response, any of the FIFO memories 64 to 69 detected to store the APS/PCC bytes corresponding to the counter values less than the threshold value transfers APS/PCC bytes that are oldest of all stored APS/PCC bytes to the transmission FIFO memory 71 (operation S15).

The operation flow then returns to operation S12. Thus, transferring of APS/PCC bytes to the transmission FIFO memory 71 from the FIFO memories 64 to 69 detected to store the APS/PCC bytes corresponding to the counter values less than the threshold value is performed repeatedly until there is no counter value less than the threshold value. When counter values less than the threshold value are no longer detected (that is, when the answer to operation S12 is No), the operation flow is switched to the operation to transfer APS/PCC bytes to the transmission FIFO memory 71 from any of the FIFO memories 64 to 69 storing APS/PCC bytes corresponding to the smallest counter value.

Figure 11:
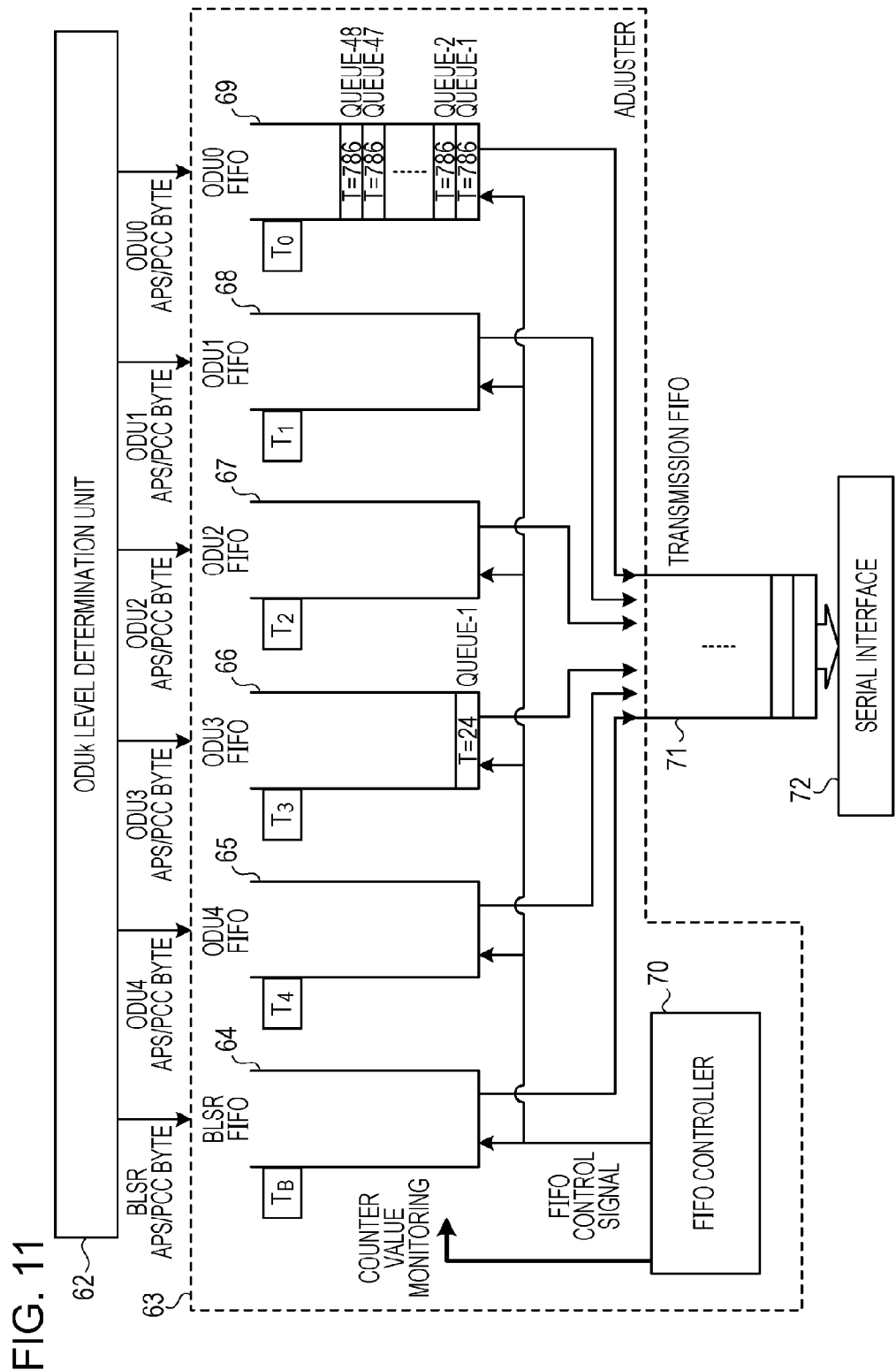
FIG. 11 is a diagram illustrating a specific example of an operation of an adjuster.
Figure 12:
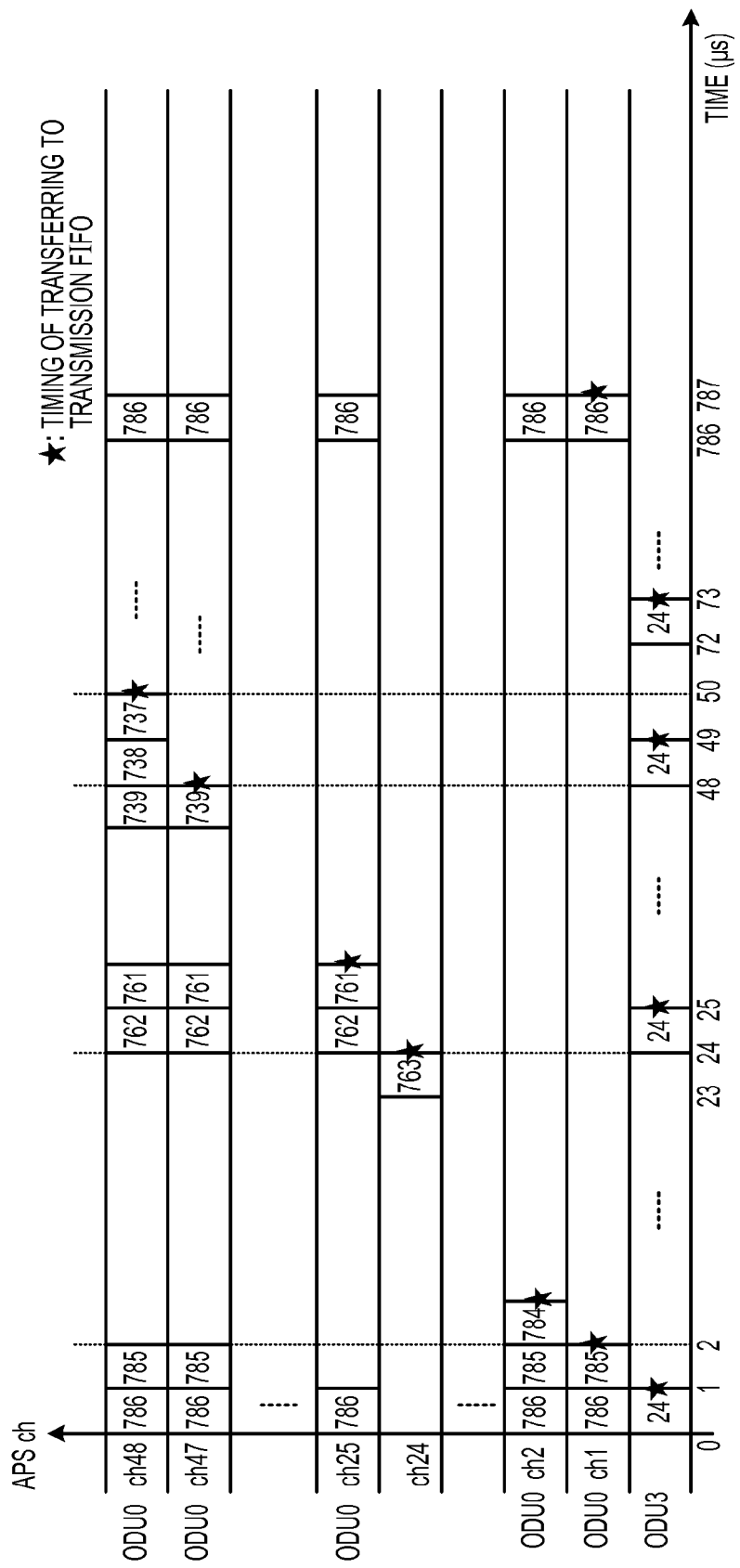
FIG. 12 is a diagram illustrating a specific example of an operation timing of an adjuster.

FIG. 11 is a diagram illustrating a specific example of an operation of the adjuster illustrated in FIG. 9. FIG. 12 is a diagram illustrating a specific example of an operation timing of the adjuster illustrated in FIG. 9. In the following discussion, it is assumed by way of example but not limitation that the transfer rate of the serial interface 72 is 60 Mbps, the frame length of one channel of APS/PCC bytes is 60 bits, and these values determine other various values described below. Thus, the frame period of one channel of APS/PCC bytes is 1 µs according to equation (7) described below.

$$60 \text{ [bits/channel]}/60 \text{ [Mbps]}=1 \text{ [µs/channel]} \quad (7)$$

When the frame period of one channel of APS/PCC bytes is equal to 1 µs, the APS/PCC bytes are transferred with a period of 1 µs from the transmission FIFO memory 71 to the control unit 73. Therefore, the counter values associated with the APS/PCC bytes stored in the respective FIFO memories 64 to 69 for the BLSR and the ODUk are decremented with a period of 1 µs.

The frame period of each layer of the ODU4 is 9.344 µs. Therefore, when APS/PCC bytes of the ODU4 level are stored in the ODU4 FIFO memory 65, the initial value $T_4$ may be set to be smaller than 9.344 µs. The setting made in the above-described manner allows it to transfer the APS/PCC bytes stored in the ODU4 FIFO memory 65 to the control unit 73 by a time at which the APS/PCC bytes of the ODU4 level are updated next. As a specific example, the initial value $T_4$ may be set to 9 µs.

The frame period of each layer of the ODU3 is 24.28 µs. Therefore, when APS/PCC bytes of the ODU3 level are stored in the ODU3 FIFO memory 66, the initial value $T_3$ may be set to be smaller than 24.28 µs. The setting made in the above-described manner allows it to transfer the APS/PCC bytes stored in the ODU3 FIFO memory 66 to the control unit 73 by a time at which the APS/PCC bytes of the ODU3 level are updated next. As a specific example, the initial value $T_3$ may be set to 24 µs.

The frame period of each layer of the ODU2 is 97.528 µs. Therefore, when APS/PCC bytes of the ODU2 level are stored in the ODU2 FIFO memory 67, the initial value $T_2$ may be set to be smaller than 97.528 µs. The setting made in the above-described manner allows it to transfer the APS/PCC bytes stored in the ODU2 FIFO memory 67 to the control unit 73 by a time at which the APS/PCC bytes of the ODU2 level are updated next. As a specific example, the initial value $T_2$ may be set to 97 µs.

The frame period of each layer of the ODU1 is 391.768 µs. Therefore, when APS/PCC bytes of the ODU1 level are stored in the ODU1 FIFO memory 68, the initial value $T_1$ may be set to be smaller than 391.768 µs. The setting made in the above-described manner allows it to transfer the APS/PCC bytes stored in the ODU1 FIFO memory 68 to the control unit 73 by a time at which the APS/PCC bytes of the ODU1 level are updated next. As a specific example, the initial value $T_1$ may be set to 391 µs.

The frame period of each layer of the ODU0 is 786.832 µs. Therefore, when APS/PCC bytes of the ODU0 level are stored in the ODU0 FIFO memory 69, the initial value $T_0$ may be set to be smaller than 786.832 µs. The setting made in the above-described manner allows it to transfer the APS/PCC bytes stored in the ODU0 FIFO memory 69 to the control unit 73 by a time at which the APS/PCC bytes of the ODU0 level are updated next. As a specific example, the initial value $T_0$ may be set to 786 µs.

When BLSR APS/PCC bytes are stored in the BLSR FIFO memory 64, the initial value $T_B$ may be set to be smaller than any initial value $T_k$ employed when the APS/PCC bytes of the ODUk level are stored in the corresponding FIFO memories 65 to 69 of the ODUk. The setting made in the above-described manner allows it to transfer the BLSR APS/PCC bytes to the control unit 73 in priority to the APS/PCC bytes of the ODUk level. As a specific example, the initial value $T_B$ may be set to 5 μs.

When APS/PCC bytes are transferred to the transmission FIFO memory 71 from any of the FIFO memories 64 to 69 storing APS/PCC bytes corresponding to a counter value less than the threshold value, the threshold value may be set to be equal to the number of sets of APS/PCC bytes stored in each of the FIFO memories 64 to 69.

The operation is described in further detail below for a specific example where APS/PCC bytes of the ODU3 level of one channel and APS/PCC bytes of the ODU0 level of 48 channels are simultaneously input to ODU3 FIFO memory 66 and the ODU0 FIFO memory 69, respectively. FIG. 11 illustrates an initial state immediately after APS/PCC bytes of the ODU3 level of one channel and APS/PCC bytes of the ODU0 level of 48 channels are stored. In FIG. 11, queue-1, queue-2, . . . in the ODU3 FIFO memory 66 and the ODU0 FIFO memory 69 respectively denote APS/PCC bytes, and numerals following "T=" each denote a counter value.

FIG. 12 illustrates timing of transferring APS/PCC bytes of each channel (ch) with elapsed time since the state illustrated in FIG. 11. In FIG. 12, a symbol of each solid star indicates timing of transferring APS/PCC bytes to the transmission FIFO memory 71 from the respective FIFO memories 64 to 69 of BLSR and ODUk.

As illustrated in FIG. 11 and FIG. 12, in an initial state at time 0, APS/PCC bytes of one channel associated with a counter value of 24 are stored in the ODU3 FIFO memory 66. At the same time, APS/PCC bytes of 48 channels associated with a counter value of 786 are stored in the ODU0 FIFO memory 69.

At time 1 after an elapse of 1 μs, APS/PCC bytes of the ODU3 level with a least counter value of 24 are transferred to the transmission FIFO memory 71. As a result, the ODU3 FIFO memory 66 becomes empty. Thereafter, the counter value associated with the APS/PCC bytes of 48 channels of the ODU0 level is decremented to 785.

At time 2 after a further elapse of 1 μs, APS/PCC bytes of one channel of the ODU0 level are transferred to the transmission FIFO memory 71. As a result, the number of sets of APS/PCC bytes remaining in the ODU 0 FIFO memory 69 becomes 47, and the counter value associated with the APS/PCC bytes of the remaining 47 channels of the ODU0 level is decremented to 784.

In this state, the threshold value for the ODU0 FIFO memory 69 may be equal to, for example, the number of sets of APS/PCC bytes stored in the ODU 0 FIFO memory 69, and more specifically, 47. The counter value associated with the APS/PCC bytes of the ODU0 level is not smaller than the threshold value, and thus the operation of transferring APS/PCC bytes associated with the least counter value to the transmission FIFO memory 71 is further continued.

Thus, APS/PCC bytes of channels 2 to 24 of the ODU0 level are transferred to the transmission FIFO memory 71 until time 24 is reached after 22 μs has further elapsed. At time 24, the counter value is 763 for the APS/PCC bytes of channel 24 transferred to the transmission FIFO memory 71.

The APS/PCC bytes of the ODU3 level are updated at time 24, and thus the APS/PCC bytes whose associated counter value is 24 are stored in the ODU3 FIFO memory 66. In this state, the counter values associated with the APS/PCC bytes stored in the ODU0 FIFO memory 69 is 762.

Therefore, at time 25 after a further elapse of 1 μs, APS/PCC bytes of the ODU3 level with a least counter value of 24 are transferred to the transmission FIFO memory 71. As a result, the ODU3 FIFO memory 66 becomes empty. Thereafter, the counter value associated with the APS/PCC bytes of channels 25 to 48 of the ODU0 level is decremented to 761.

The operation is performed repeatedly in a similar manner. Thus, by time 48, APS/PCC bytes of channels 25 to 47 of the ODU0 level are transferred to the transmission FIFO memory 71. At time 48, APS/PCC bytes of the ODU3 level are updated, and APS/PCC bytes whose associated counter value is 24 are stored in the ODU3 FIFO memory 66. At time 49, APS/PCC bytes of the ODU3 level with a least counter value of 24 are transferred to the transmission FIFO memory 71.

At time 50, APS/PCC bytes of channel 48 of the ODU0 level with a least counter value of 737 are transferred to the transmission FIFO memory 71. As a result, the ODU0 FIFO memory 69 becomes empty.

At time 72, APS/PCC bytes of the ODU3 level are updated, and APS/PCC bytes whose associated counter value is 24 are stored in the ODU3 FIFO memory 66. At time 73, APS/PCC bytes of the ODU3 level with a least counter value of 24 are transferred to the transmission FIFO memory 71.

When time 786 is reached after a further elapse of time, APS/PCC bytes of 48 channels of the ODU0 level are updated, and APS/PCC bytes of 48 channels associated with a counter value of 786 are stored in the ODU0 FIFO memory 69. At time 787, APS/PCC bytes of channel 1 of the ODU0 level with a least counter value of 786 are transferred to the transmission FIFO memory 71. A description of following operations is omitted.

In the transmission apparatus 31 illustrated in FIG. 8, as described above, an adjustment is performed such that APS/PCC bytes with a shorter updating period are transferred to the control unit 73 earlier than other APS/PCC bytes with a longer updating period. This keeps APS/PCC bytes with a shorter updating period away from being updated during an operation of transferring APS/PCC bytes with a longer updating period, and thus it becomes possible to allow APS/PCC bytes to be correctly transferred to the controller 6 before the APS/PCC bytes are updated. Furthermore, an adjustment is performed such that APS/PCC bytes that are to be updated in a period of time less than the threshold value are transferred to the control unit 73 earlier than other APS/PCC bytes. This keeps some APS/PCC bytes away from not being transferred to the control unit 73. Thus, in the transmission apparatus 31, it becomes possible to keep the control unit 73 away from failing to receive some APS/PCC bytes, which may cause a malfunction to occur in switching a line to a detour route.

Furthermore, in the transmission apparatus 31 illustrated in FIG. 8, the time at which each set of APS/PCC bytes is updated next is counted by decrementing the counter value associated with the APS/PCC bytes stored in the corresponding one of FIFO memories 64 to 69 of BLSR or ODUk. Furthermore, in the transmission apparatus 31 illustrated in FIG. 8, APS/PCC bytes are stored in the FIFO memories 64 to 69 such that the APS/PCC bytes are allowed to be transferred to the control unit 73 in the same order as that in which the APS/PCC bytes are stored in the FIFO memories 64 to 69.

In the transmission apparatus 31 illustrated in FIG. 6, APS/PCC bytes of BLSR may be detected and transferred. In this case, the serial interface 47 of the transmission apparatus 31 may be configured to transfer the APS/PCC bytes of BLSR to the control unit 48 at a correct time. Furthermore, in the transmission apparatus 31 illustrated in FIG. 7, APS/PCC bytes of BLSR may be detected and transferred. In this case, the transmission apparatus 31 may include a BLSR APS interface configured to transfer the APS/PCC bytes of BLSR.

Furthermore, in the transmission apparatus 31 illustrated in FIG. 6, APS/PCC bytes of the ODUflex level may be detected and transferred. In this case, the serial interface 47 of the transmission apparatus 31 may be configured to transfer the APS/PCC bytes that are to be updated with a shortest updating period to the control unit 48 at a correct time. Furthermore, in the transmission apparatus 31 illustrated in FIG. 7, APS/PCC bytes of the ODUflex level may be detected and transferred. In this case, the transmission apparatus 31 may include an ODUflex APS interface configured to transfer the APS/PCC bytes of the ODUflex level. Furthermore, in the transmission apparatus 31 illustrated in FIG. 8, APS/PCC bytes of the ODUflex level may be detected and transferred. In this case, the transmission apparatus 31 may include an ODUflex FIFO memory configured to store the APS/PCC bytes of the ODUflex level.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
   a detector configured to receive a multiplexed signal including a plurality of signals having different frame periods and detect switching information included in the multiplexed signal;
   a sorter configured to sort a plurality of pieces of detected switching information included in the plurality of signals into one or more groups according to the different frame periods of the plurality of signals, a frame period being indicative of an updating period of respective pieces of detected switching information;
   an adjuster configured to adjust an order of transferring the sorted plurality of pieces of detected switching information, according to a period with which the switching information is received;
   a transfer unit configured to transfer the sorted plurality of pieces of detected switching information, based on a result of the adjustment performed by the adjuster;
   a controller configured to generate path setting information to set transmission paths of the signals based on the sorted plurality of pieces of detected switching information transferred from the transfer unit; and
   a switch unit configured to set the transmission paths based on the path setting information generated by the controller.

2. The transmission apparatus according to claim 1, wherein the adjuster holds the plurality of pieces of switching information output from the sorter in association with information indicating a time at which each piece of switching information is to be updated next, and makes an adjustment such that a piece of switching information that is to be updated next in a shorter time is transferred earlier than other pieces of switching information that are to be updated in longer times.

3. The transmission apparatus according to claim 2, wherein the adjuster makes the adjustment such that a piece of switching information that is to be updated next in a time less than a threshold value is transferred earlier than other pieces of switching information.

4. The transmission apparatus according to claim 1, wherein the adjuster is configured to
   set a counter value in association with each piece of switching information included in the plurality of pieces of switching information,
   set each counter value to have an initial value corresponding to a period with which a corresponding piece of switching information is to be updated, the setting being performed in synchronization with outputting of the switching information from the sorter, and
   decrement each counter value at a time corresponding to a period with which the transfer unit transfers the switching information.

5. The transmission apparatus according to claim 1, wherein the adjuster includes a plurality of first-in first-out memory in which the plurality of pieces of switching information output from the sorter are stored separately for each updating period.

6. The transmission apparatus according to claim 1, wherein the detector detects switching information from each of the plurality of signals that are input asynchronously via the plurality of transmission paths.

7. A transmission apparatus comprising:
   a detector configured to detect switching information from a plurality of signals having different frame periods;
   an adjuster configured to adjust an order of transferring a plurality of pieces of detected switching information, sorted into one or more groups according to the different frame periods of the plurality of signals, based on an ascending order of updating periods of the respective sorted plurality of pieces of detected switching information;
   a transfer unit configured to transfer the sorted plurality of pieces of detected switching information in a time shorter than a period with which switching information included in a signal having a smallest frame period is to be updated;
   a controller configured to generate path setting information to set transmission paths of the signals based on the sorted plurality of pieces of detected switching information transferred from the transfer unit; and
   a switch unit configured to set the transmission paths based on the path setting information generated by the controller.

8. A transmission method comprising:
   detecting switching information as to switching of a line, from a plurality of signals having different frame periods;
   sorting a plurality of pieces of detected switching information included in the plurality of signals into one or more groups according to the different frame periods of the plurality of signals, a frame period being indicative of an updating period of respective pieces of detected switching information;
   making an adjustment such that the sorted plurality of pieces of detected switching information are transmitted in ascending order of a time at which next updating is to be performed;
   transferring the sorted plurality of pieces of detected switching information, based on a result of the adjustment;

generating path setting information to set transmission paths of the signals based on the transferred sorted plurality of pieces of detected switching information; and setting the transmission paths based on the generated path setting information.

9. The transmission method according to claim 8, further comprising:

holding the sorted plurality of pieces of switching information, in association with information indicating a time at which each piece of switching information is to be updated next, and making an adjustment such that a piece of switching information that is to be updated next in a shorter time is transferred earlier than other pieces of switching information that are to be updated in longer times.

10. The transmission method according to claim 8, further comprising:

holding the sorted plurality of pieces of switching information, in association with information indicating a time at which each piece of switching information is to be updated next, and making an adjustment such that a piece of switching information that is to be updated in a time with a value less than a threshold value is transferred earlier than other pieces of switching information.

* * * * *